(12) United States Patent
Suita et al.

(10) Patent No.: US 7,607,712 B2
(45) Date of Patent: Oct. 27, 2009

(54) STRUCTURE OF SIDE COVER FOR MOTORCYCLE

(75) Inventors: Yoshikazu Suita, Samutprakam (TH); Unnop Kongnakorn, Samutprakam (TH); Pisithsak Surawichai, Samutprakam (TH)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 62 days.

(21) Appl. No.: 12/024,042

(22) Filed: Jan. 31, 2008

(65) Prior Publication Data
US 2008/0202835 A1  Aug. 28, 2008

Related U.S. Application Data

(63) Continuation-in-part of application No. 11/971,177, filed on Jan. 8, 2008, now abandoned, and a continuation-in-part of application No. 11/971,154, filed on Jan. 8, 2008, now abandoned.

(60) Provisional application No. 60/892,190, filed on Feb. 28, 2007, provisional application No. 60/892,200, filed on Feb. 28, 2007.

(51) Int. Cl.
*B62J 17/00* (2006.01)
(52) U.S. Cl. .................................... 296/78.1
(58) Field of Classification Search ................. 296/78.1
See application file for complete search history.

(56) References Cited

U.S. PATENT DOCUMENTS

| | | | | |
|---|---|---|---|---|
| 4,087,110 A | * | 5/1978 | Vetter | 296/78.1 |
| 4,413,700 A | * | 11/1983 | Shiratsuchi | 296/78.1 |
| 5,183,130 A | * | 2/1993 | Nakamura et al. | 180/219 |
| 6,502,658 B1 | * | 1/2003 | Nagashii | 180/219 |
| 6,983,974 B2 | * | 1/2006 | Suzuki | 296/78.1 |
| 7,134,706 B2 | * | 11/2006 | Michisaka et al. | 296/97.22 |
| 7,490,890 B2 | * | 2/2009 | Nakabayashi et al. | 296/75 |
| 7,552,960 B2 | * | 6/2009 | Yoshitake et al. | 296/78.1 |
| 2002/0167191 A1 | * | 11/2002 | Tsukui et al. | 296/78.1 |
| 2002/0189877 A1 | * | 12/2002 | Yagisawa et al. | 180/219 |
| 2005/0082100 A1 | * | 4/2005 | Sakaki et al. | 180/219 |
| 2008/0079310 A1 | * | 4/2008 | Yamakura et al. | 303/115.4 |
| 2008/0202835 A1 | * | 8/2008 | Suita et al. | 180/219 |
| 2008/0238018 A1 | * | 10/2008 | Yoshizawa | 280/166 |

FOREIGN PATENT DOCUMENTS

| JP | 06-278668 | 10/1994 |
|---|---|---|
| JP | 2004-291700 | 10/2004 |

\* cited by examiner

*Primary Examiner*—Kiran B. Patel
(74) *Attorney, Agent, or Firm*—Hogan & Hartson LLP

(57) ABSTRACT

A motorcycle has a frame cover that covers at least a part of a body frame. A body cover is disposed on left and right sides of the body frame. A front cover covers a region below a steering handle. A leg shield is attached to the front cover and is formed with an opening that opens toward a front part of the motorcycle to allow wind in to cool the engine. The frame cover has a cable crossing portion that extends in a direction crossing an extension direction of a cable extending along the body frame, in order to prevent exposure and projection of cables toward the outside. The frame cover also has a forwardly extending support member that is inserted into the opening of the leg shield and supports the leg shield.

16 Claims, 13 Drawing Sheets

(a)

(b)

XVII-XVII cross section

STRUCTURE OF SIDE COVER FOR MOTORCYCLE

RELATED APPLICATIONS

This application is a continuation-in-part of U.S. application Ser. No. 11/971,177, filed on Jan. 8, 2008, and is a continuation-in-part of U.S. application Ser. No. 11/971,154, filed on Jan. 8, 2008, which applications are incorporated by reference in their entireties. This application also claims the benefit of priority under 35 USC 119(e) of U.S. provisional application No. 60/892,190, filed on Feb. 28, 2007, and U.S. provisional application No. 60/892,200, filed on Feb. 28, 2007, which applications are hereby incorporated by reference in their entireties.

BACKGROUND OF THE INVENTION

1. Field of the Invention

The present invention relates to a motorcycle having a frame cover that covers at least a part of a body frame, a body cover provided on left and right sides of the body frame, a front cover that covers a lower portion of a steering handle, and a leg shield mounted detachably to the front cover.

2. Description of Related Art

A body cover for a motorcycle has been proposed including a side cover covering sides of a main frame, an upper cover covering sides of a radiator, and an engine cover covering sides of an engine. The side cover is attached and detached according to the preference of the user. See, for example, JP-A-6-278668.

This type of motorcycle, in which the main frame is exposed by removing the side cover, tends to have a simple and monotonous external appearance. Moreover, since the body cover covers only the main frame, radiator and engine, cables provided on the body frame may be exposed. Exposure and projection of the cables outside the vehicle deteriorates the external appearance of the vehicle.

A motorcycle has also been proposed in which an opening that leads travel wind to a neighborhood of an engine is formed on a leg shield that covers the front of a driver's legs, thus cooling the engine. See, for example, JP-A-2004-291700.

However, forming an opening on the leg shield causes a problem in that the opening decreases the rigidity of the leg shield, which leads to deformation or fluttering of the leg shield depending upon the wind pressure in travel.

SUMMARY OF THE INVENTION

The present invention provides a motorcycle having a body frame whose external appearance is not monotonous, and that prevents projection of cables to the outside.

A motorcycle according to a first aspect of the invention includes a frame cover that covers at least a part of a body frame. A body cover is disposed on left and right sides of the body frame. The frame cover has a band-plate-shaped cable crossing portion that extends in a direction crossing an extension direction of a cable extending along the body frame.

According to the first aspect of the invention, the cable crossing portion of the frame cover crosses the extension direction of the cable. Thus, projection of the cable toward the outside and deterioration of the appearance due to exposure of the cable to the outside is prevented.

In addition, the frame cover covers the body frame to provide an external appearance that looks as if the frame cover constitutes a part of the body frame. Thus, the external appearance of the body frame is not monotonous.

In one embodiment, a main frame portion extends diagonally downward and rearward from a head pipe, and a seat rail portion extends diagonally upward and forward from a rear region of the main frame. The cable crossing portion is disposed along an extension line extending diagonally downward and forward from the seat rail portion.

According to this embodiment, the cable crossing portion is disposed along the extension line extending forward from the seat rail portion to provide an external appearance that looks as if the cable crossing portion constitutes a part of the frame. Thus, a novel design is obtained.

In one embodiment, a cover portion covers a rear end of the main frame portion. In this case, the cover portion is formed integrally with the cable crossing portion.

According to this embodiment, the cover portion covering the rear end of the main frame provides an external appearance that looks as if the cover portion constitutes a part of the body frame. Thus, a novel design is further obtained.

A motorcycle according to a second aspect of the invention includes a frame cover that covers at least a part of a body frame A body cover is disposed on left and right sides of the body frame. The frame cover has a cable covering portion that extends along a cable provided along the body frame.

According to the second aspect of the invention, the cable covering portion extending along the cable prevents projection of the cable toward the outside and deterioration of appearance due to exposure of the cable to the outside.

In one embodiment, the cable covering portion has a flange bent toward the body frame in a lateral cross-sectional view, forming a quadrangular shape with one side opened as a whole.

According to this embodiment, since the cable covering portion has a quadrangular shape with one side opened in the cross-sectional view, outward projection of the cable is more securely prevented.

In another embodiment of the invention, a motorcycle is provided that ensures stiffness of a leg shield having an opening formed therein, while cooling the neighborhood of an engine.

A motorcycle according to this embodiment includes a front cover mounted to the body frame and covering a region below the steering handle. A leg shield is connected detachably to the front cover to cover a region forwardly of a rider's legs and is formed with an opening that opens toward a front part of the motorcycle. A support member is inserted into the opening from a rear part of the motorcycle to support the leg shield.

According to this embodiment, the opening formed in the leg shield and opened toward the front of the motorcycle allows travel wind into the leg shield to cool the neighborhood of the engine. The support member inserted into the opening from the rear of the motorcycle compensates for a decrease in rigidity due to formation of the opening on the leg shield, thus preventing the leg shield from being deformed by wind pressure in travel.

In one embodiment, a guide is formed at a tip end of the support member and is arranged in the opening to guide wind rearward.

According to this embodiment, the guide provided in the opening surely allows travel wind in and improves coolability for the neighborhood of the engine.

In a further embodiment, a first engaging portion is formed on the front cover and a second engaging portion is formed on the leg shield. The second engaging portion engages the first engaging portion as the front cover and the leg shield are moved relatively in an engaging direction, and the first and second engaging portions are brought into tight contact in a vehicle width direction.

According to this embodiment, since the engaging portions of the front cover and the leg shield are moved relatively to be brought into tight contact in the vehicle width direction, the leg shield is prevented from separating from the front cover, thus improving the appearance of the joint of the front cover and leg shield.

In a further embodiment, the first engaging portion is positioned inward in the vehicle width direction and has a surface that is inclined inward as it goes forward in the engaging direction. The second engaging portion is positioned outward in the vehicle width direction and has a pressing surface that makes sliding contact with the inclined surface.

According to this embodiment, one latch is formed with an inclined surface and the other is formed with a push surface that abuts against the inclined surface, the front cover and leg shield are surely brought into pressure contact, thus preventing separation of the leg shield.

In a further embodiment of the invention, the front cover includes a front side front cover and a rear side front cover. The first engaging portions are formed on both the front side and rear side front covers, and the second engaging portion is formed on the leg shield to engage with the first engaging portions.

According to this embodiment, since the first engaging portions are formed on both the front side and rear side front covers, and the second engaging portion is formed on the leg shield to engage the first engaging portions, the leg shield is prevented from fluttering or separating from both sections into which the front cover is divided.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Figure 1:
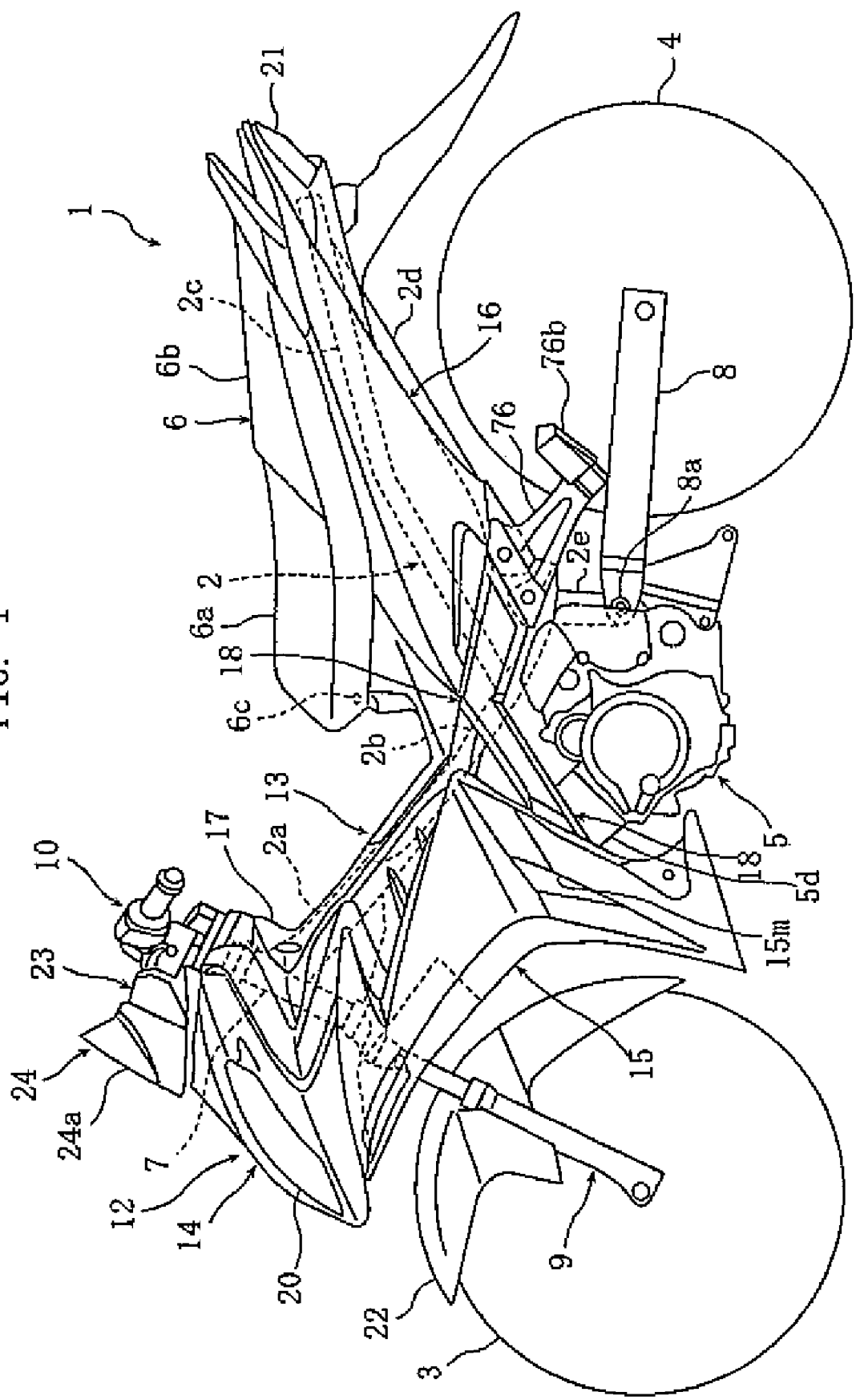
FIG. 1 is a side view of a motorcycle according to an embodiment of the invention.

An embodiment of the invention is now described with reference to the drawings. FIGS. 1-18 illustrate a motorcycle 1 according an embodiment of the invention. The front-rear and left-right directions in the following description are from the perspective of a rider sitting on a seat. The terms "inward" and "outward" are directions in a vehicle width (lateral) direction.

Motorcycle 1 has an under-bone-type body frame 2, a front wheel 3 disposed at the front end of body frame 2, a rear wheel 4 disposed at the rear end of body frame 2, an engine 5 mounted below body frame 2, and a straddle-type seat 6 disposed above body frame 2.

Body frame 2 has a head pipe 7 positioned at its front end. A main frame 2a extends diagonally downward and to the rear from head pipe 7. Left and right down tubes 2b extend diagonally downward to the rear from main frame 2a while expanding outward. Left and right seat rails 2c extend diagonally upward to the rear from rear ends of down tubes 2b. Left and right seat stays 2d connect rear ends of seat rails 2c and down tubes 2b.

Rear arm bracket 2e is connected to rear ends of down tubes 2b and extends downward. A rear arm 8 is supported by rear arm bracket 2e via a pivot shaft 8a to swing upward and downward. Rear wheel 4 is supported by the rear end of rear arm 8.

A front fork 9 is supported by head pipe 7 to be steered to the left and right. Front wheel 3 is supported by the lower end of front fork 9. A steering handle 10 is fixed to the upper end of front fork 9.

A meter unit 23 including a speed meter, a fuel meter, a signal lamp and the like is provided forwardly of steering handle 10. A meter cover 24 covers a front region of meter unit 23. A visor 24a provided on meter cover 24 guides wind generated by running of the vehicle to an area above the rider to reduce the wind pressure.

Seat 6 is mounted on seat rails 2c and includes a main seat 6a on which a rider sits formed integrally with a tandem seat 6b on which a tandem rider sits. Seat 6 is rotatable upward and downward around a front hinge 6c. A battery, fuel tank, storage box and the like are disposed below seat 6.

Engine 5 is a water-cooled-type four-stroke engine, and is suspended by down tubes 2b. Revolution force of engine 5 is transmitted to rear wheel 4 via a power transmission component such as a chain.

Figure 5:
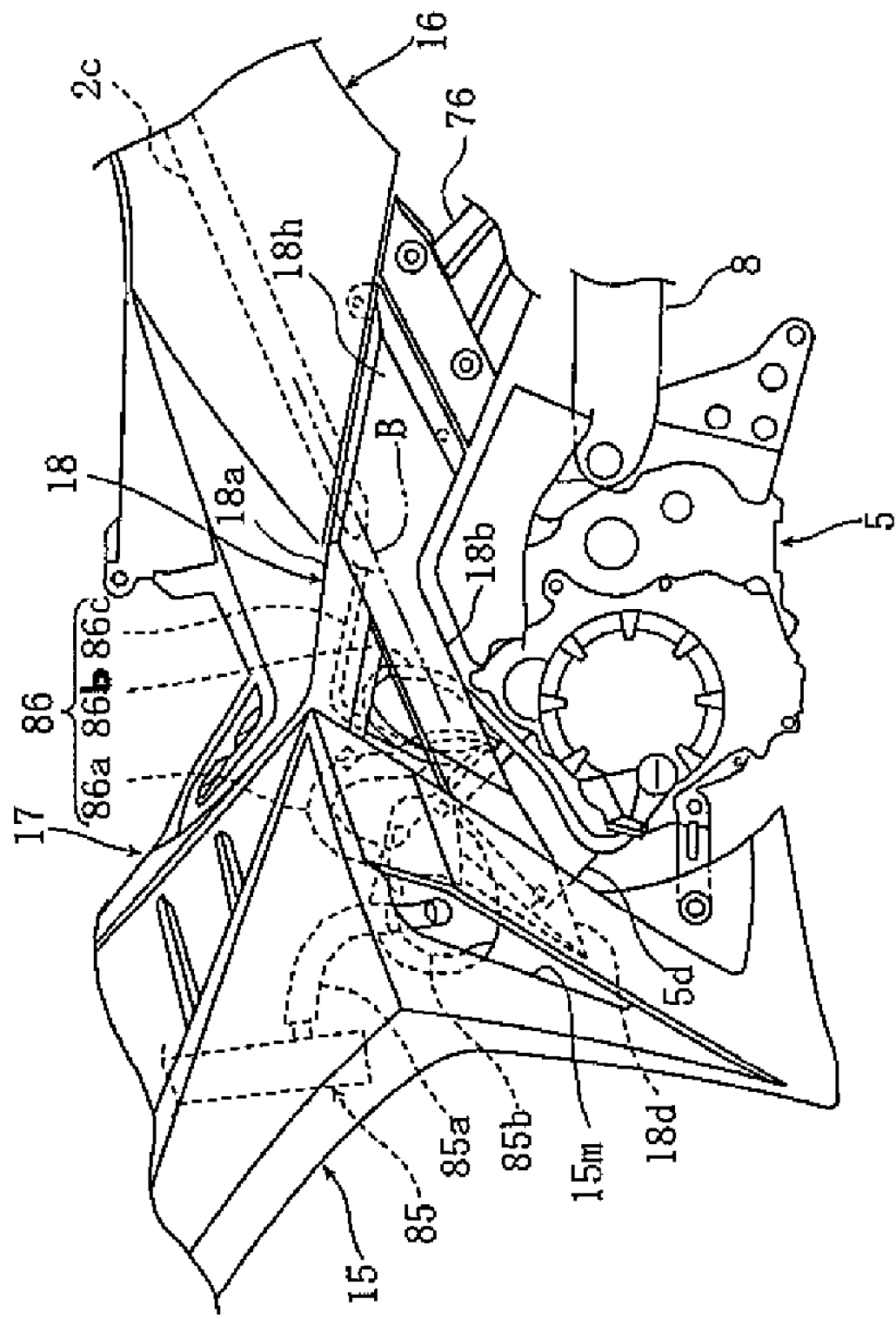
FIG. 5 is a side view of a frame cover provided on the leg shield.

A radiator 85 is disposed above and forward of engine 5 to reduce increases in engine temperature (FIG. 5). A cooling water pump 85b is connected with radiator 85 via a cooling water hose 85a and supplies cooling water from radiator 85 to engine 5.

Various cables 86 are disposed along body frame 2 and connected with engine 5. Cables 86 include a breather hose 86a that returns unburned gas to the intake system, a charge cable 86b that connects a magneto contained in engine 5 and the battery disposed below seat 6, and a neutral switch cable 86c that connects a neutral switch that detects the neutral position of a transmission contained in engine 5 and a control unit, and other cables.

Charge cable 86b extends upward on the left from its connection with engine 5, forming a loop shape above engine 5. Neutral switch cable 86c extends upward on the right outside from its connection with engine 5, and along down tubes 2b above engine 5.

Body frame 2 is covered by a body cover 13. Body cover 13 has a front cover 12 covering the peripheral area below steering handle 10, right and left leg shields 15 detachably connected with front cover 12 and covering the front regions of the legs of a rider, and a side cover 16 covering the peripheral area below seat 6. A head light unit 20 is disposed at the front end of front cover 12. A tail light unit 21 is positioned at the rear end of side cover 16.

Front cover 12 has a front side front cover 14 covering the area forward of head pipe 7, and a rear side front cover 17 detachably connected with front side front cover 14 and covering the area behind head pipe 7. Front side and rear side front covers 14 and 17 are fixed to head pipe 7 or main frame 2a via a bracket, a stay or the like.

Front cover 14 has an upper cover portion 14a extending diagonally downward to the front, and left and right lower cover portions 14b extending diagonally downward, rearward and inward from the left and right lower edges of upper cover portion 14a. Front side front cover 14 has an approximate V shape as viewed from the left side. An approximately triangular front mold 19 is detachably attached to upper cover portion 14a.

Left and right light openings 14c are formed on upper cover portion 14a. As viewed from the front of the vehicle, light openings 14c have a substantially elliptical shape whose front edges 14d are positioned close to each other and which extend diagonally upward and outward from front edges 14d. Light openings 14c expand through approximately the entire area of upper cover portion 14a.

Head light unit 20 is disposed on light openings 14c. Head light unit 20 includes left and right head lights 20a positioned in parallel in the vehicle width direction, and left and right winker lights 20b positioned above and behind head lights 20a. Head lights 20a and winker lights 20b are formed integrally with each other.

Figure 15:
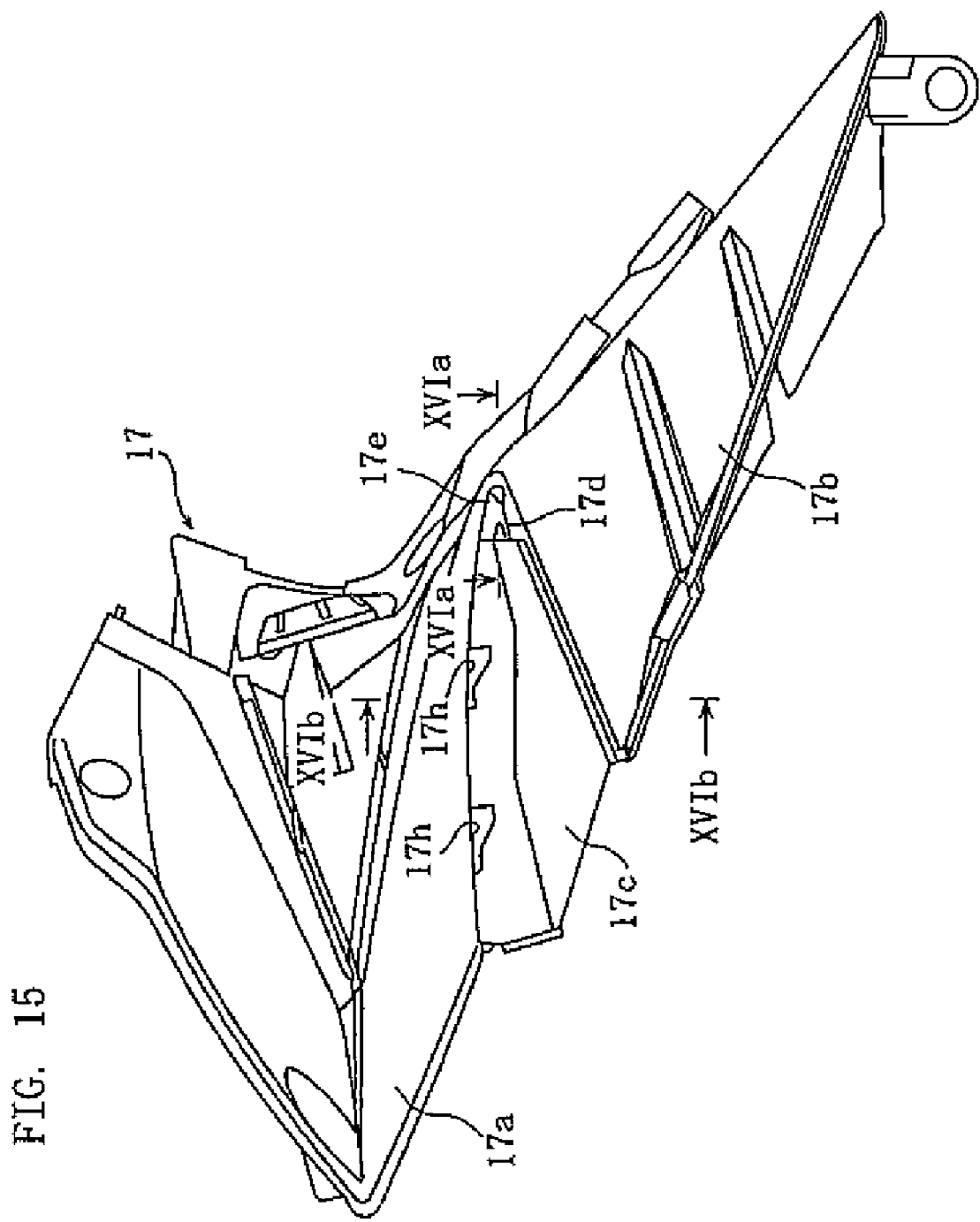
FIG. 15 is a side view of the front cover.
Figure 16:
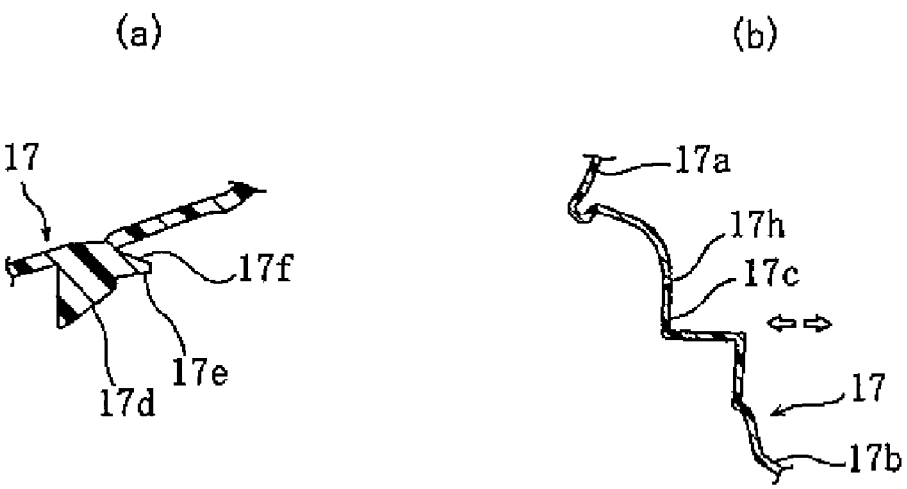
FIGS. 16A and 16B are cross-sectional views of the front cover taken, respectively, through lines XVIa-XVIa and XVIb-XVIb of FIG. 15.

Rear side front cover 17 has an upper cover portion 17a covering the area behind head pipe 7, and a lower cover portion 17b extending diagonally downward to the rear from upper cover portion 17a and covering the area above and on the left and right sides of main frame 2a. A leg shield engaging portion 17c is provided on the boundary between upper cover portion 17a and lower cover portion 17b (FIG. 15).

Figure 12:
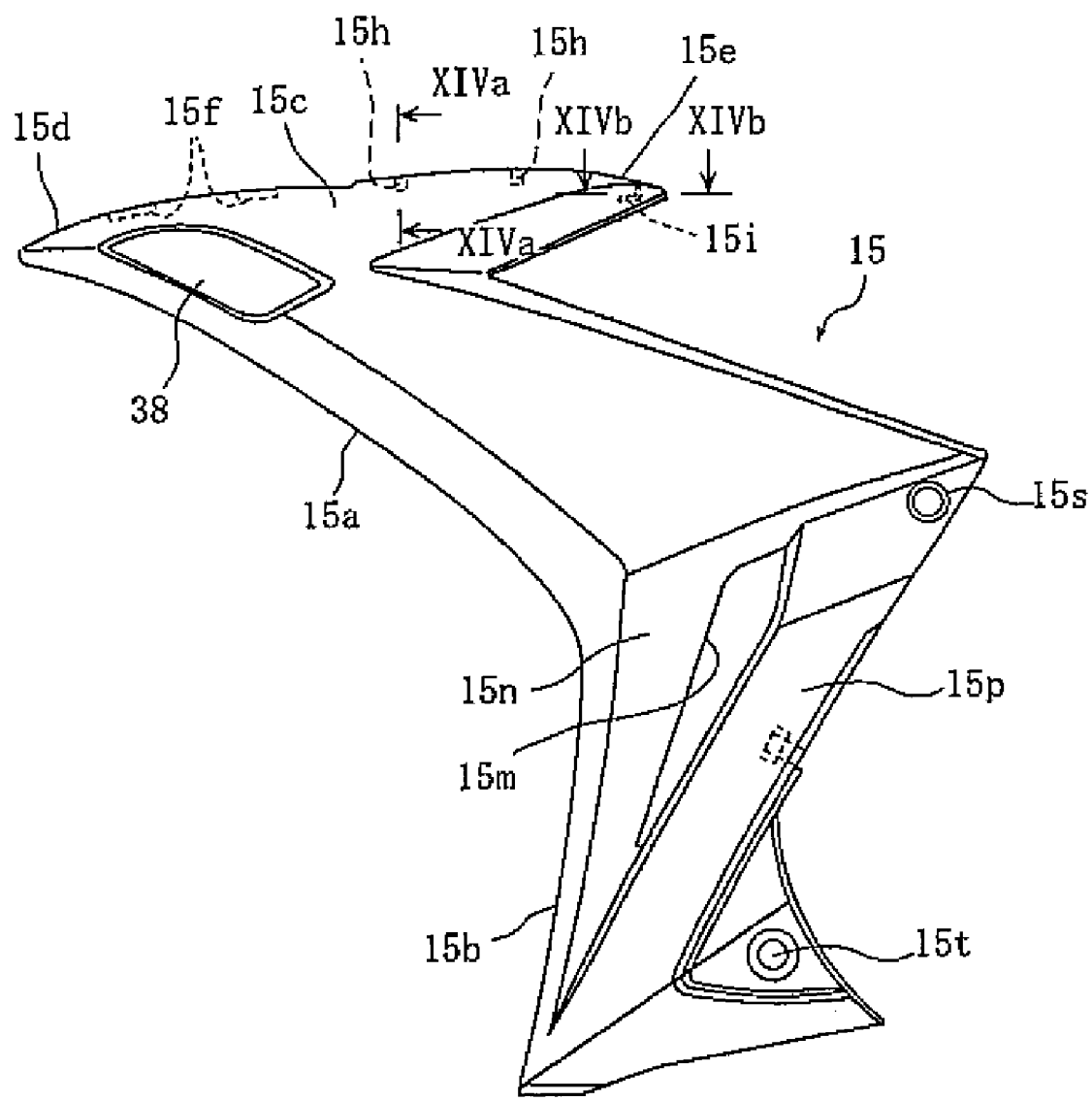
FIG. 12 is a side view of the leg shield.

Each leg shield 15 has an upper half 15a extending diagonally downward to the rear from the lower edge of front cover 12, and a lower half 15b extending downward from upper half 15a. Thus, leg shield 15 has an approximately V shape as viewed from the left side of the vehicle (FIG. 12).

Figure 2:
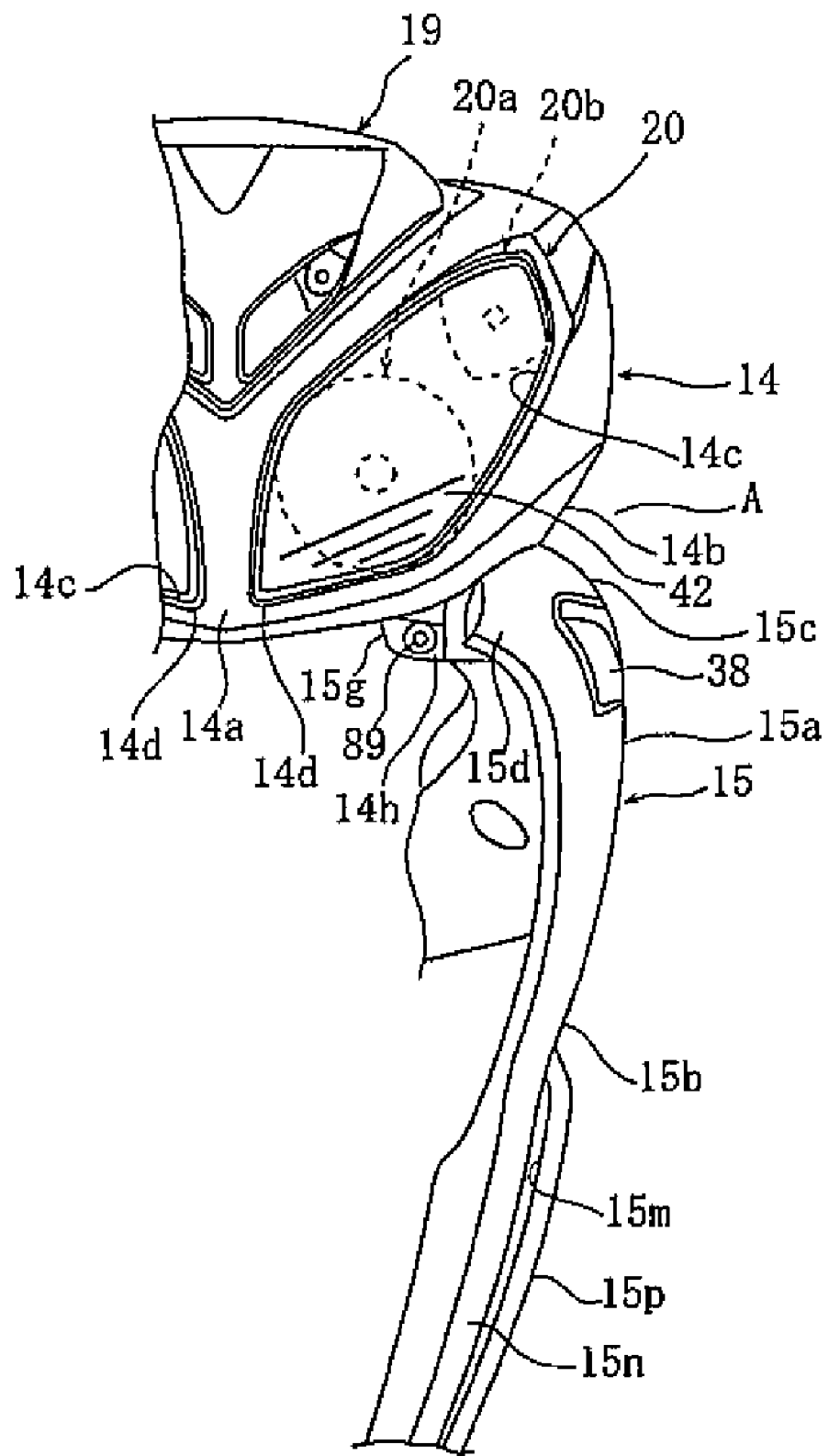
FIG. 2 is a front view of a front cover and a leg shield provided on the motorcycle.

Upper half 15a has an expanding portion 15c expanding outward from the upper edge. Expanding portion 15c and lower cover portion 14b of front side front cover 14 form a narrow portion A having a V shape concaved inward as viewed from the front of the vehicle (FIG. 2). This is a novel design producing a completely original shape.

Expanding portion 15c has a front tapered portion 15d extending forward with tapering, and a rear tapered portion 15e extending rearward with tapering. Each of the front tapering portions 15d has a position light 38. Position lights 38 are visible and easily recognized from the front of the vehicle by the presence of narrow portion A.

Leg shields 15 are detachably connected with front side and rear side front covers 14 and 17 by a structure described below in detail.

Front and rear engaging holes (first engaging portions) 14i, 14i are formed on lower edges of lower cover portions 14b of front side front cover 14. Attachment flanges 14h project downward from front edges of lower cover portions 14b (FIG. 2).

An engaging portion 17d projects outward from the rear edge of engaging portion 17c formed on rear side front cover 17. Engaging portion 17d has an engaging piece (second engaging portion) 17e projecting rearward. An inclined surface 17f that inclines inward from the rear to the front in an engaging (front-rear) direction C is formed on an inner surface in the vehicle width direction of engaging piece 17e. Front and rear engaging holes (first engaging portions) 17h are formed forwardly of engaging portion 17d. Engaging holes 17h are wide on the rear side and narrow on the front side (see FIGS. 6 and 16). Engaging holes 14i of front side front cover 14 have shapes similar to those of engaging holes 17h of rear side front cover 17.

Figure 3:
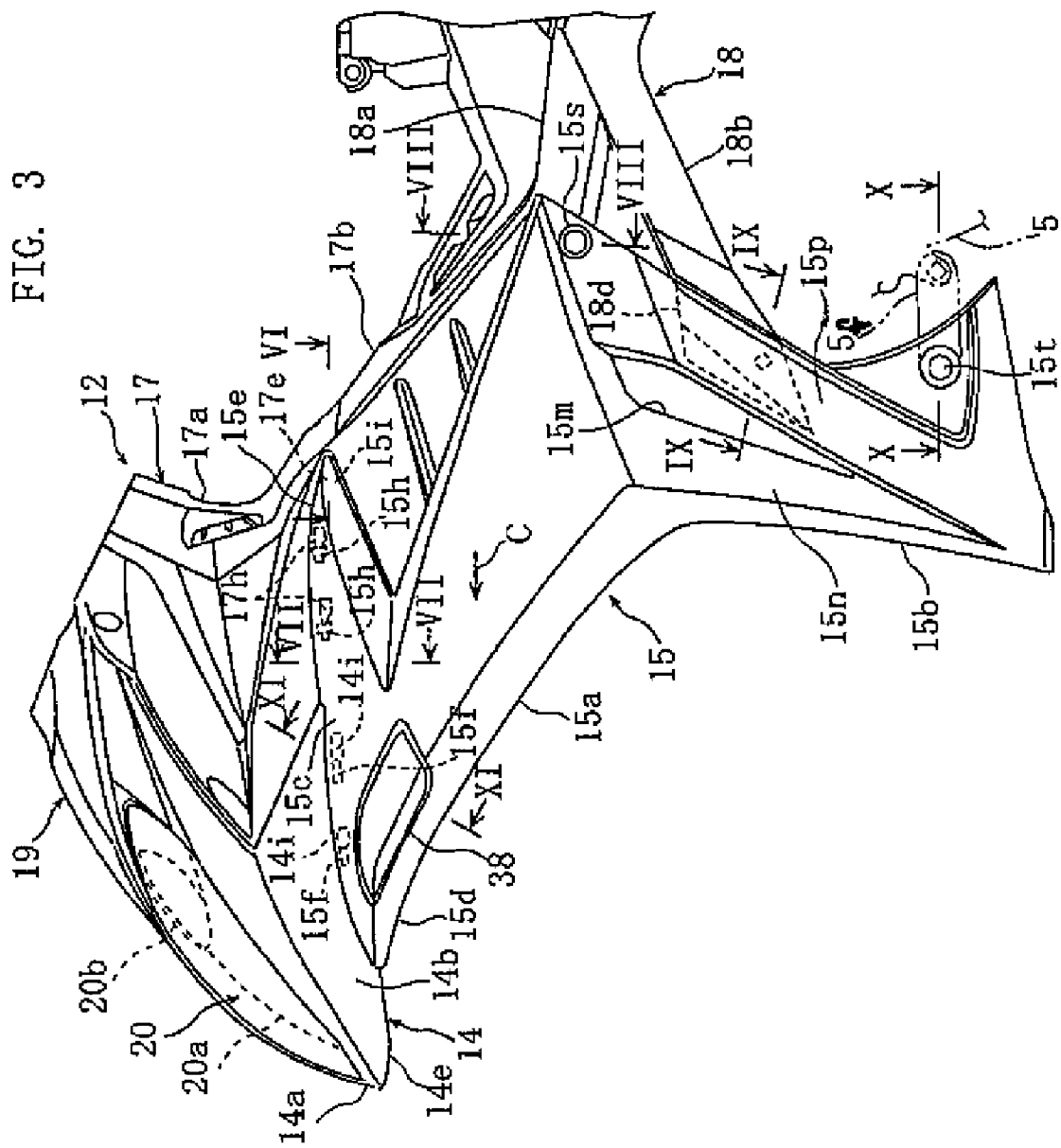
FIG. 3 is a side view of the front cover and the leg shield.
Figure 4:
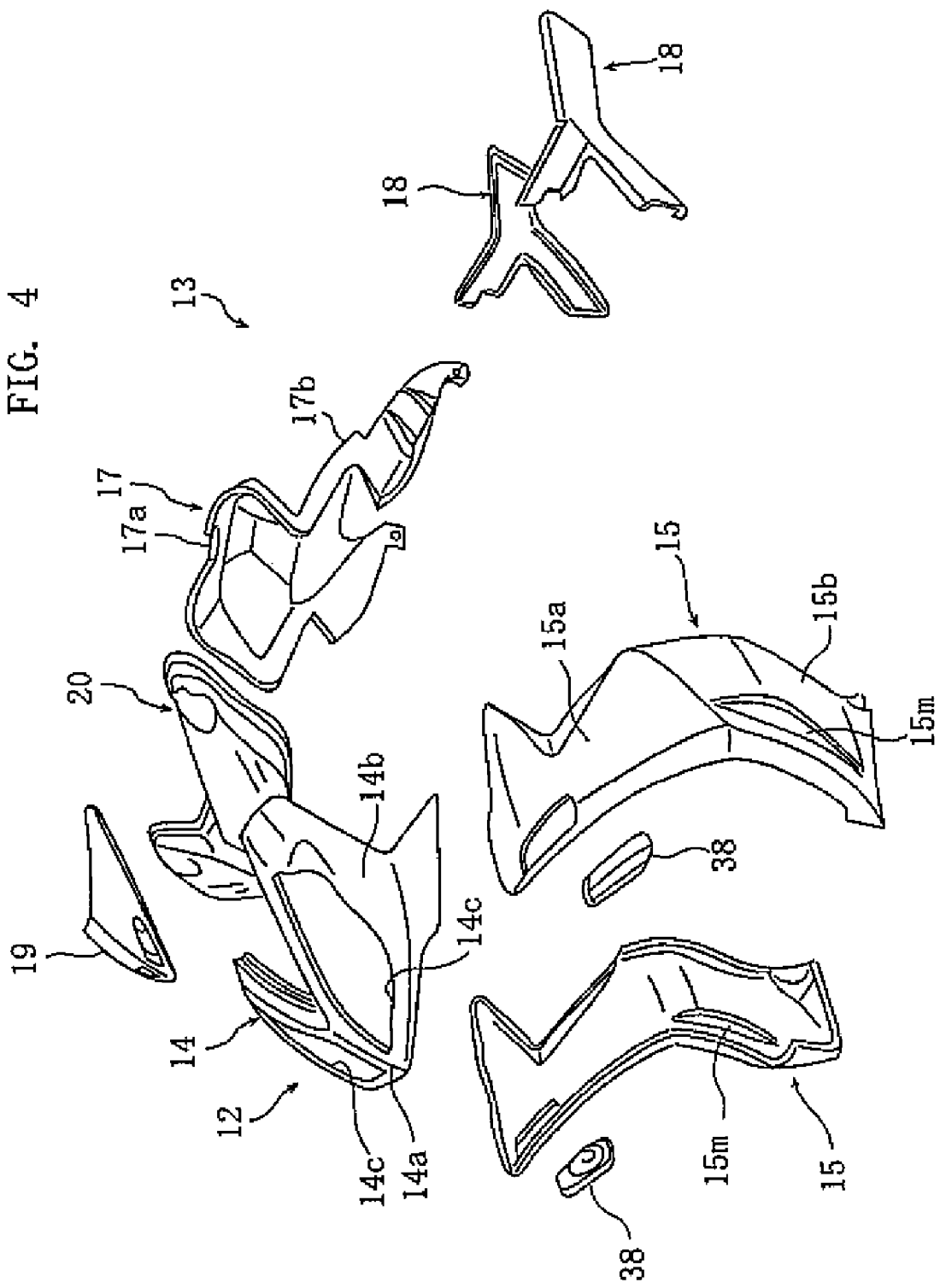
FIG. 4 is a perspective view of the disassembled front cover and leg shields.
Figure 13:
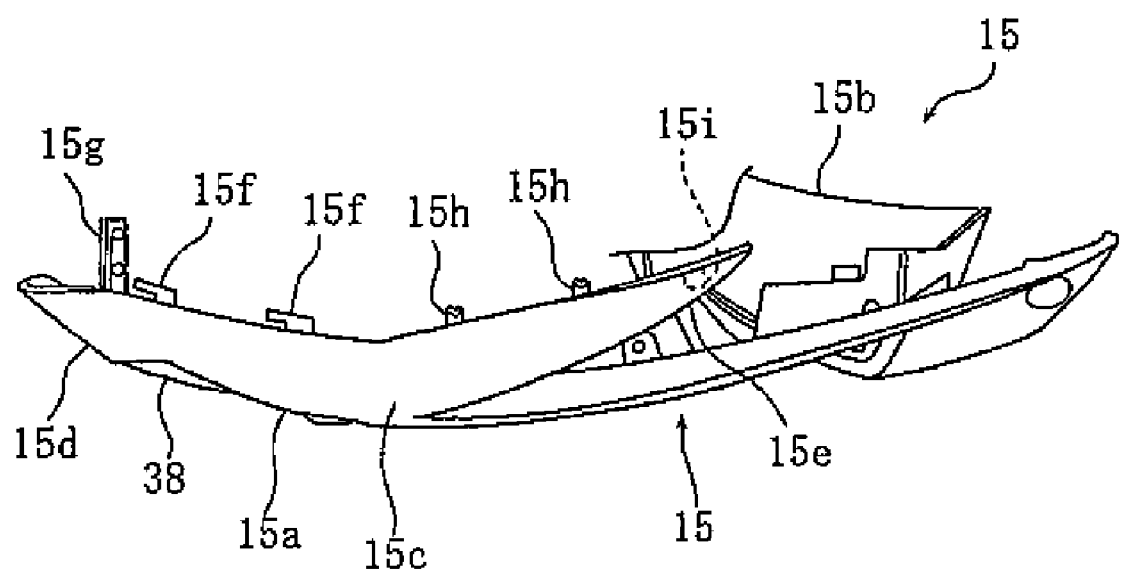
FIG. 13 is a plan view of the leg shield.
Figure 14:
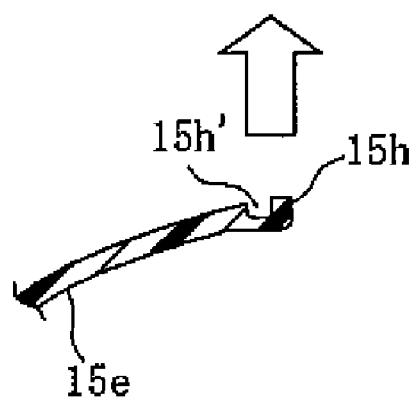
FIGS. 14A and 14B are cross-sectional views of the leg shield taken, respectively, through lines XIVa-XIVa and XIVb-XIVb of FIG. 12.
Figure 14:
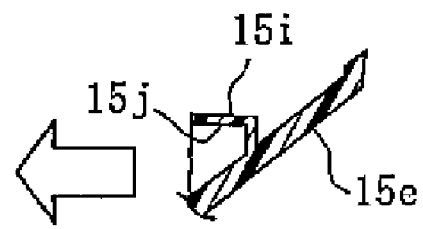

Front and rear hook-shaped engaging pieces (second engaging portions) 15f project forward and inward from an upper edge of front tapered portion 15d of leg shield 15 (FIG. 13). Engaging pieces 15f engage with engaging holes 14i of front side front cover 14 (FIG. 3).

Front and rear engaging pieces (second engaging portions) 15h are provided behind engaging pieces 15f at the upper edge of leg shield 15 at positions corresponding to engaging holes 17h of rear side front cover 17. As illustrated in FIG. 14A, a groove 15h' having a width corresponding to a thickness of an upper edge of engaging hole 17h is formed at each end of engaging pieces 15h.

Figure 6:
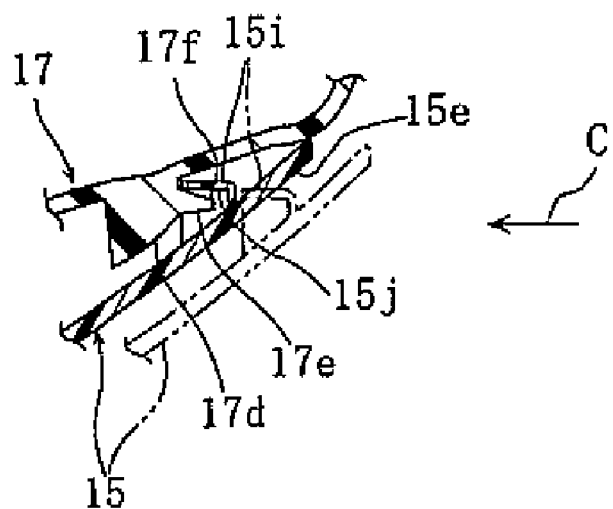
FIG. 6 is a cross-sectional view of an engaging area between the front cover and the leg shield taken through line VI-VI of FIG. 3.
Figure 7:
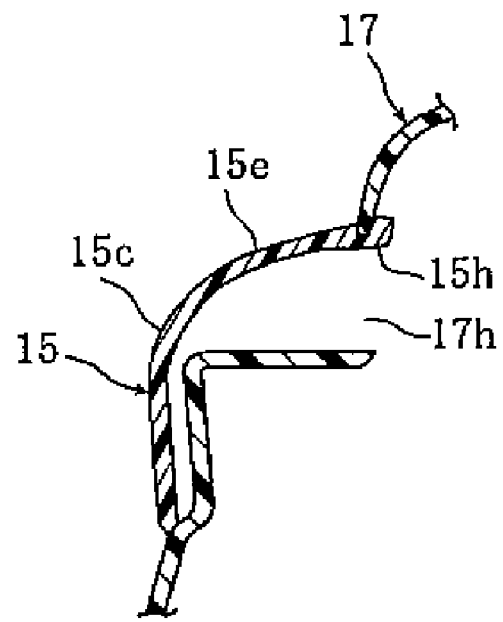
FIG. 7 is a cross-sectional view of an engaging area between the front cover and the leg shield taken through line VII-VII of FIG. 3.

An engaging piece 15i that engages with engaging piece 17e of rear side front cover 17 is provided at the rear edge of rear tapered portion 15e. Engaging piece 15i has a box shape which opens to the front, and has a pressing surface 15j that makes sliding contact with inclined surface 17f of engaging piece 17e (FIGS. 6 and 14B).

In attaching leg shield 15 to front side front cover 14 and rear side front cover 17, engaging pieces 15f of leg shield 15 are inserted into the wide portions of engaging holes 14i of front side front cover 14. Engaging pieces 15h of leg shield 15 are inserted into the wide portions of engaging holes 17h of rear side front cover 17. Engaging piece 15i of leg shield 15 is positioned on inclined surface 17f of engaging piece 17e of rear side front cover 17. Leg shield 15 in this condition is shifted toward the vehicle front (arrow C direction). As engaging piece 15i slides on inclined surface 17f, rear tapered portion 15e of leg shield 15 is pulled inward. As a result, the area around rear tapered portion 15e of leg shield 15 is brought into tight contact with the area around engaging portion 17c of rear side front cover 17 in the vehicle width direction. Simultaneously, engaging pieces 15h engage with the front narrow portions of engaging holes 17h, thereby securely connecting the area around rear tapered portion 15e of leg shield 15 and the area around engaging portion 17c of rear side front cover 17 without looseness. Also, engaging pieces 15f, 15f of leg shield 15 engage with the narrow portions of engaging holes 14i of front side front cover 14, thereby securely connecting the area around front tapered portion 15d of leg shield 15 and the lower edge of front side front cover 14 without looseness.

An inwardly projecting attachment piece 15g is provided at a front edge of front tapered portion 15d and is fixed to attachment flange 14h of front side front cover 14 by a screw 89 (see FIGS. 2 and 13).

Figure 8:
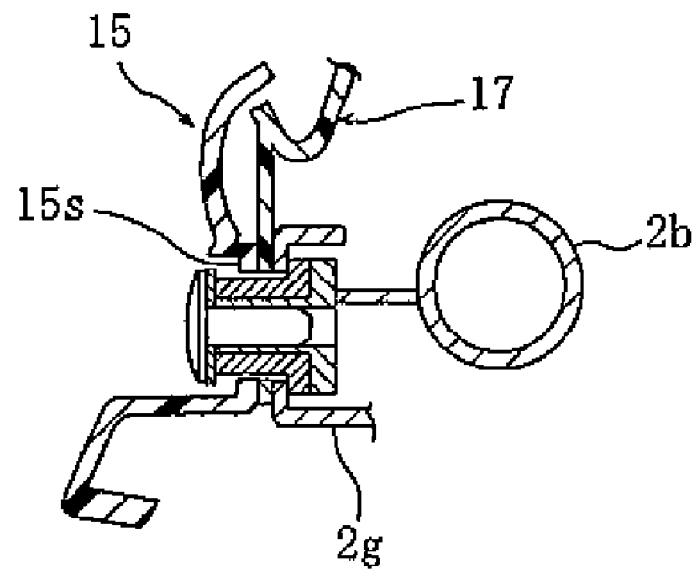
FIG. 8 is a cross-sectional view of an attachment area of the leg shield taken through line VIII-VIII of FIG. 3.
Figure 10:
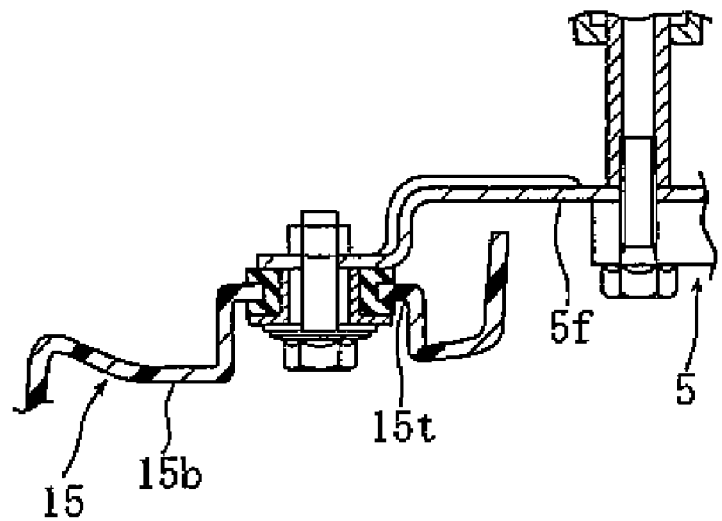
FIG. 10 is a cross-sectional view of an attachment area of the leg shield taken through line X-X of FIG. 3.
Figure 11:
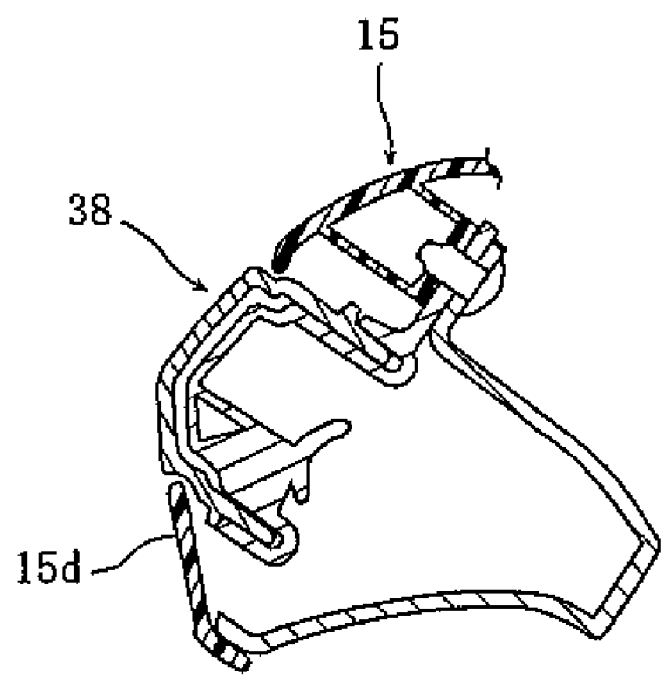
FIG. 11 is a cross-sectional view of a position light provided on the leg shield taken through line XI-XI of FIG. 3.

A rear end 15s on the boundary between upper half 15a and lower half 15b of leg shield 15, and rear side front cover 17 are fixed to a down tube 2b by a bolt via cover bracket 2g (FIG. 8). A rear lower end 15t of lower half 15b of leg shield 15 is fixed to a bracket 5f secured to engine 5 by a bolt (FIGS. 3 and 10).

A vertically extending opening 15m formed on lower half 15b of leg shield 15 opens to the front of motorcycle 1. An opening edge 15p' of opening 15m is bent inward. A cylinder unit 5d of engine 5 is disposed behind opening 15m (FIGS. 1, 5).

Opening 15m forms a separation between a front wall 15n and a rear wall 15p, which constitute the periphery of opening 15m in the front-rear direction. Opening 15m is produced by shifting rear wall 16p outwardly from front wall 15n.

Left and right frame covers 18 are disposed between left and right leg shields 15 and side cover 16 to cover an area above engine 5. Frame covers 18 have a color different from the color of leg shields 15 and side cover 16, providing an external appearance that looks as if frame covers 18 constitute a part of body frame 2.

Each frame cover 18 has a band-plate-shaped first frame portion 15a inclined diagonally downward and to the rear along down tubes 2b, and a band-plate-shaped second frame portion 18b extending diagonally downward and to the front from substantially the center of first frame portion 18a in the longitudinal direction. Thus, first frame portion 18a and second frame portion 18b form an approximately Y shape expanding toward the front (FIG. 17).

Figure 17:
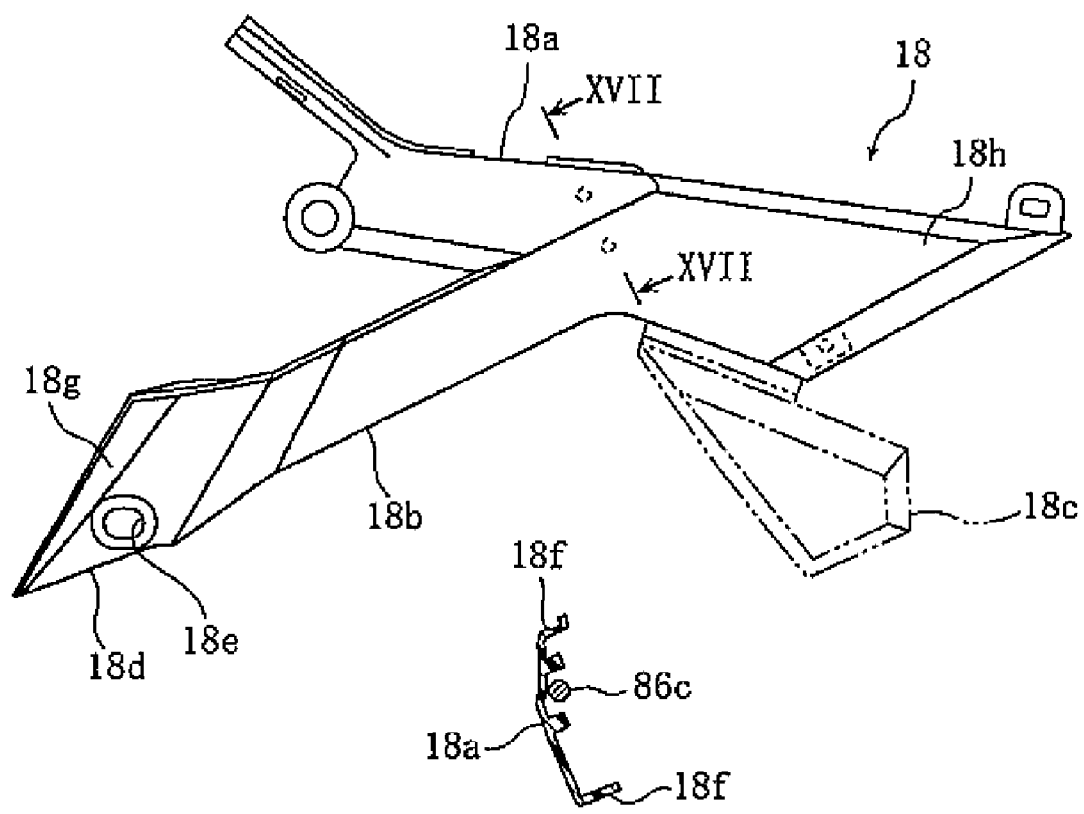
FIG. 17 is a side view of the frame cover.
Figure 18:
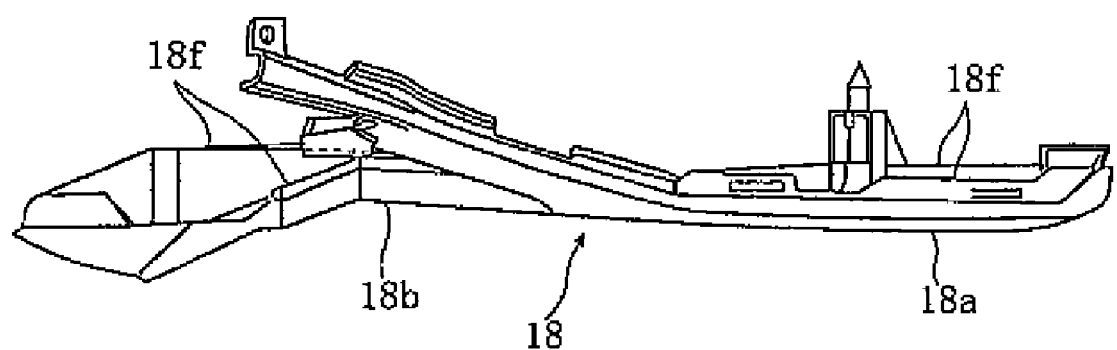
FIG. 18 is a plan view of the frame cover.

The right frame cover 18 has a third frame portion 18c extending diagonally downward and to the rear, in a direction opposite to the direction of second frame portion 18b, from a rear end lower edge of first frame portion 18a (FIG. 17).

Flanges 18f bent inward toward body frame 2 in lateral cross section are formed integrally with outer peripheries of frame portions 18a-18c to increase the bending and twisting rigidity of frame cover 18.

A supporting portion 18d extending toward the front is provided on second frame portion 18b. Supporting portion 18d is inserted from the rear of motorcycle 1 into the inside of rear wall 15p constituting opening 15m of leg shield 15. A supporting hole 18e is formed at the front end of supporting portion 18d.

Figure 9:
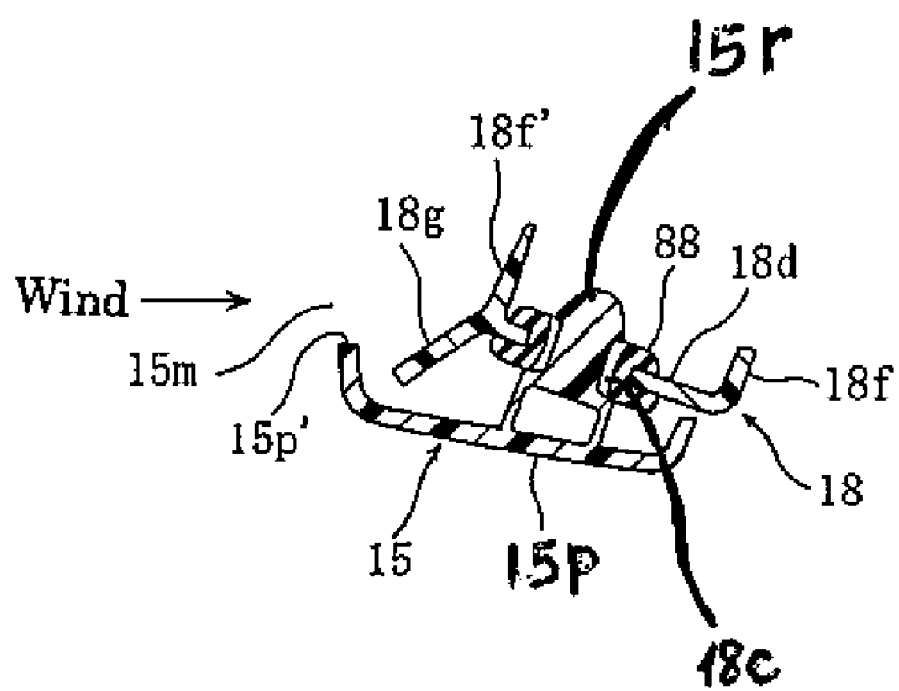
FIG. 9 is a cross-sectional view of an opening of the leg shield taken through line IX-IX of FIG. 3.

A projection 15r projecting toward the inside is formed integrally with the inside wall of rear wall 15p. Projection 15r is inserted into supporting hole 18e via a grommet 88. This structure allows opening 15m to be supported by frame cover 18 functioning as a supporting member (FIG. 9).

A guide portion 18g guiding wind entering opening 15m rearward is formed integrally with a front end of supporting portion 18d of frame cover 18. Guide portion 18g extends in a direction opposite to a flange 18f of supporting portion 18d, and in a direction toward opening edge 15p' of rear wall 15p. Wind introduced into opening 15m is thereby efficiently guided toward the exhaust region of cylinder unit 5d by guide portion 18g and flange 18f.

First frame portion 18a of frame cover 18 has a cover portion 18h covering the connecting area between down tubes 2b and seat stays 2d from the outside. Cover portion 18h is formed integrally with second frame portion 18b to form a continuous surface.

The front edge of a tandem foot bracket 76 is disposed at a rear edge of cover portion 18h to form a substantially continuous surface. Foot bracket 76 is fixed to seat stay 2d by bolt via a bracket. A tandem step 76b is attached to the distal end of foot bracket 76 in a manner to be rotatable between a ride position and a retracted position. Since foot bracket 76 forms a continuous surface from cover portion 18h of first frame portion 18a which extends along down tubes 2b, frame cover 18 has an external appearance as being a part of the body frame supporting foot bracket 76.

Second frame portion 18b extends along an extension line B extended diagonally downward and forward from seat rail 2c and has an external appearance that looks as if second frame portion 18b is an extension of seat rail 2c (FIG. 5). Second frame portion 18b functions as a cable crossing portion extending in a direction crossing neutral switch cable 86c provided along down tubes 2b. Second frame portion (cable crossing portion) 18b covers neutral switch cable 86c and charge cable 86b from the outside in the vehicle width direction.

First frame portion 18a functions as a cable covering portion extending along neutral switch cable 86c provided along down tubes 2b. Neutral switch cable 86c is contained in a space surrounded by first frame portion (cable covering portion) 18a and flanges 18f above and below first frame portion 18a (FIG. 17).

According to this embodiment, since an opening 15m opening to the front of motorcycle 1 is provided on each leg shield 15, wind generated by running motorcycle 1 is introduced into leg shields 15 and further to engine 5. Accordingly, the area around cylinder unit 5d of engine 5 is more effectively cooled.

The relatively large opening on leg shield 15 creates a possibility of decreased rigidity of leg shield 15. According to this embodiment, however, opening 15m is supported by supporting portion 18d of frame cover 18 inserted from the rear. Thus, any lowered rigidity due to formation of opening 15m on leg shield 15 is supplemented by frame cover 18 which has a relatively high rigidity. Accordingly, leg shield 15 is not deformed or fluttered by wind pressure during running.

According to this embodiment, guide portions 18f and 18g for guiding wind toward the rear where engine 5 is located are provided on supporting portion 18d. Thus, wind is more securely guided to the desired area, and cooling efficiency for engine 5 is enhanced. In particular, since guide portions 18f and 18g are positioned to concentrate wind flow on the exhaust area of cylinder unit 5d, engine 5 is further effectively cooled.

According to this embodiment, since engaging piece 17e is provided on rear side front cover 17 and engages with engaging piece 17e formed on rear tapered portion 15e of leg shield 15, rear side front cover 17 and leg shield 15 are brought into tight contact with each other in the vehicle width direction, and flutter or separation of rear tapered portion 15e of leg shield 15 from rear side front cover 17 is securely prevented. Accordingly, the appearance of the junction area between rear side front cover 17 and leg shield 15 is improved.

According to this embodiment, since engaging piece 15i slidingly contacts inclined surface 17f provided on engaging portion 17d of rear side front cover 17 when leg shield 15 shifts toward the front, leg shield 15 comes into tight contact more securely, and separation of leg shield 15 in the vehicle width direction is more effectively prevented.

In this embodiment, since engaging holes 14i and 17h formed on front side and rear side front covers 14 and 17 engage with engaging pieces 15f and 15h formed on leg shield 15, separation and flutter of leg shield 15 from front cover 12, which is divided into two sections, is securely prevented.

According to this embodiment, since frame cover 18 covers the rear end of down tube 2b, and second frame portion 18b extends in a direction crossing the extension direction of cables 86s, projection of cables 86 toward the outside in the vehicle width direction is prevented, and deterioration of appearance due to exposure of cables 86 to the outside is avoided.

Since an external appearance which looks as if frame cover 18 constitutes a part of body frame 2 is obtained, the frame external appearance is not monotonous.

According to this embodiment, since second frame portion 18*b* extends along extension line B extended from seat rails 2*c* toward the front, there is an appearance that looks as if second frame portion 18*b* constitutes a part of the frame, and therefore a novel design is obtained.

According to this embodiment, since cover portion 18*h* covers the rear end of down tube 2*b*, an appearance that looks as if cover portion 18*h* constitutes a part of frame 2 is provided, thus realizing a novel design.

According to this embodiment, since first frame portion 18*a* extends along and covers cables 86, outward projection of cables 86 is prevented.

According to this embodiment, since upper and lower flanges 18*f* are formed on first frame portion 18*a* to form a quadrangular shape with one side opened in the lateral cross-sectional view, outward projection of cables 86 is further securely prevented.

The particular embodiments of the invention described in this document should be considered illustrative, rather than restrictive. Modification to the described embodiments may be made without departing from the spirit of the invention as defined by the following claims.

The invention claimed is:

1. A motorcycle, comprising:
a body frame;
a frame cover that covers at least a part of the body frame; and
a body cover disposed on left and right sides of the body frame,
wherein the frame cover has a band-plate-shaped cable crossing portion that extends in a direction crossing an extension direction of a cable extending along the body frame.

2. The motorcycle according to claim 1, wherein:
the body frame has a main frame portion extending diagonally downward and rearward from a head pipe, and a seat rail portion extending diagonally upward and rearward from a rear region of the main frame; and
the cable crossing portion is disposed along an extension line extending diagonally downward and forward from the seat rail portion.

3. The motorcycle according to claim 2, wherein:
the frame cover has a cover portion that covers the rear end of the main frame portion; and
the cover portion is formed integrally with the cable crossing portion.

4. The motorcycle according to claim 1, further comprising:
a steering handle;
a front cover mounted to the body frame to cover a region below the steering handle;
a leg shield connected detachably to the front cover to cover a region forwardly of a rider's legs and formed with an opening that opens toward a front part of the motorcycle; and
a support member that is inserted into the opening from a rear part of the motorcycle to support the leg shield.

5. The motorcycle according to claim 4, wherein a guide is formed at a tip end of the support member and is arranged in the opening to guide wind rearward.

6. The motorcycle according to claim 4, wherein:
a first engaging portion is formed on the front cover;
a second engaging portion is formed on the leg shield; and
the second engaging portion engages the first engaging portion as the front cover and the leg shield are moved relatively in an engaging direction, and the first and second engaging portions are brought into tight contact in a vehicle width direction.

7. The motorcycle according to claim 6, wherein the first engaging portion is positioned inward in the vehicle width direction and has a surface that is inclined inward as it goes forward in the engaging direction, and the second engaging portion is positioned outward in the vehicle width direction and has a pressing surface that makes sliding contact with the inclined surface.

8. The motorcycle according to claim 6, wherein the front cover includes a front side front cover and a rear side front cover, the first engaging portions are formed on both the front side and rear side front covers, and the second engaging portion is formed on the leg shield to engage the first engaging portions.

9. The motorcycle according to claim 4, and further comprising:
a position light arranged on the leg shield,
wherein an upper part of the leg shield expands outward and, together with a lower part of the front cover, defines an inwardly concaved V-shaped region that enhances visibility of the position light.

10. The motorcycle according to claim 4, further comprising:
an engine, wherein
a rear middle portion of the leg shield and a rear portion of the front cover are fixed to the body frame, and
a rear lower portion of the leg shield is fixed to the engine.

11. The motorcycle according to claim 4, further comprising:
an engine;
a seat; and
a side cover that covers a lower periphery of the seat; and
wherein the frame cover is arranged between the leg shield and side cover to cover an upper portion of the engine, and is colored differently from the leg shield and side cover to give an external appearance that the frame cover is a part of the body frame.

12. The motorcycle according to claim 11, wherein the support member is a forwardly extending part of the frame cover.

13. The motorcycle according to claim 12, wherein the support member is attached to the leg shield by a projection formed on an inside wall of the leg shield that is inserted into a supporting hole on the frame cover.

14. The motorcycle according to claim 12, wherein:
the body frame comprises a downtube connected to a seat stay; and
the frame cover covers the connection between the downtube and the seat stay.

15. The motorcycle according to claim 14, and further comprising:
a foot bracket fixed to the seat stay, wherein
the foot bracket defines a surface continuous to a part of the frame cover extending along the downtube, so that the frame cover has an external appearance as being a part of the body frame that supports the foot bracket.

16. The motorcycle according to claim 11, and further comprising:
a seat rail,
wherein a portion of the frame cover extends along an extension of the seat rail and has an external appearance as being a part of the seat rail.

* * * * *